United States Patent [19]
Abels et al.

[11] 4,432,424
[45] Feb. 21, 1984

[54] LIFT LOADER

[75] Inventors: Theodor Abels, Aschaffenburg; Güter Honecker, Seligenstadt, both of Fed. Rep. of Germany

[73] Assignee: Linde Aktiengesellschaft, Hollriegelskreuth, Fed. Rep. of Germany

[21] Appl. No.: 371,964

[22] Filed: Apr. 26, 1982

[30] Foreign Application Priority Data

Apr. 29, 1981 [DE] Fed. Rep. of Germany ....... 3117078

[51] Int. Cl.³ ............................................ B62D 11/04

[52] U.S. Cl. .................................. 180/6.48; 180/6.5; 180/54 E; 180/312; 414/635

[58] Field of Search ........................ 180/6.48, 6.5, 215, 180/216, 54 E, 65 E, 308, 311, 312, 297; 280/759; 414/635

[56] References Cited

U.S. PATENT DOCUMENTS

| | | | |
|---|---|---|---|
| 1,728,889 | 9/1929 | Kemble | 180/65 E |
| 2,957,533 | 10/1960 | Lewis et al. | 180/6.48 |
| 3,156,313 | 11/1964 | Petersen | 180/6.48 |
| 3,369,629 | 2/1968 | Weiss | 180/216 |
| 3,481,417 | 12/1969 | Jarrett et al. | 180/6.5 |
| 3,894,604 | 7/1975 | Grosseau | 180/297 |

*Primary Examiner*—Joseph F. Peters, Jr.
*Assistant Examiner*—Donn McGiehan
*Attorney, Agent, or Firm*—Buell, Blenko, Ziesenheim & Beck

[57] ABSTRACT

A lift loader is provided having two drive motors, each of which drives a vehicle wheel through a gearing arrangement located in a separate transmission housing, in which case each transmission housing is designed as a supporting structural component and is flanged at each transmission housing of the assigned drive motor and supports a wheel hub, in which case a closed vehicle frame is formed by the fact that two lateral struts project out from a rear cross bar, which advantageously can be the counterweight, where one of the two transmission housings is attached to each of these lateral struts toward the front, and where the two drive motors, each flanged at one end on a transmission housing, are connected with each other at the opposite ends such that together they form a front cross bar for the frame.

13 Claims, 2 Drawing Figures

LIFT LOADER

Figure 1:
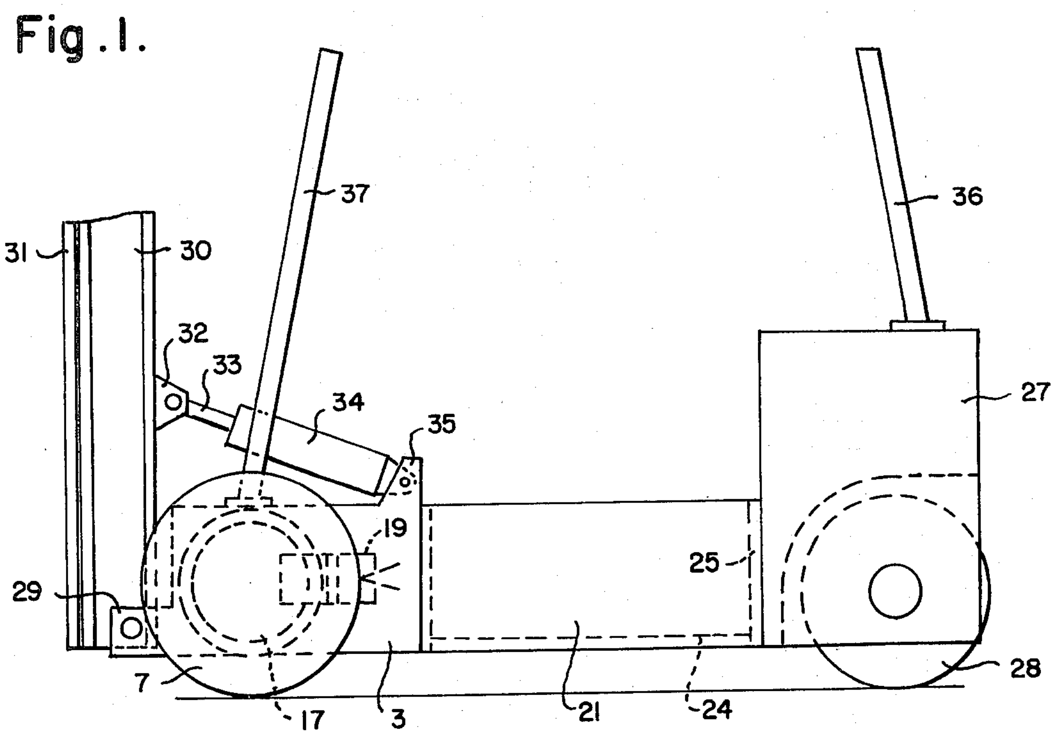

The present invention relates to lift loaders and in particular fork lifts with two drive motors, each in a housing, each of which drives a vehicle wheel through a gearing arrangement located in a separate transmission housing, in which case the lift loader has a frame and each transmission housing is designed as a supporting structural component and is connected with and forms a part of the frame and is flanged onto each motor housing of the assigned drive motor and supports a wheel hub.

A familiar lift loader of this type is provided with a frame that has a fastening plate projecting in the longitudinal directon of the vehicle on each side, in which case a transmission housing is bolted onto each of these two fastening plates. A wheel hub section, in which a wheel hub is bearing-supported, is constructed in a projecting manner on the transmission housing, in which case a bearing and corresponding space are provided between the vehicle wheel and the transmission housing, such that the lifting structure can be supported on this bearing. The motor is flanged on the transmission housing on the same side on which the wheel also lies. The purpose of this design is to provide as favorable as possible power flow path of the load of the lifting structure to the vehicle wheels; however, it has the essential disadvantage that the vehicle wheels must be relatively far from the transmission housing, so that the forces acting in the case of an unloaded lifting structure from the vehicle wheel engage on a large lever arm at the transmission housing and must be conveyed from the latter through the fastening plate into the frame which is closed toward the front. The closed portion of the frame is thus quite far from the driven wheels of the vehicle. The said structural components must thus be very large in size in order to achieve an adequate resistance to twisting.

The invention proposes to offer a construction for the components receiving the power flow, with a low material expense and space requirement and which furnishes a favorable force factor.

For this purpose, the frame of the lift loader is equipped with a rear cross bar and lateral struts and each transmission housing is designed as an extension of one of these lateral struts toward the front and the two drive motors are arranged parallel to each other so that they extend from the transmission housing to the center of the vehicle and the housings of the two drive motors are connected with each other in a substantially rigid bending-resistant manner directly or indirectly, at least in the operating state. With the rear cross bar, the lateral struts, the transmission housings, and the drive motor housings, a closed frame thus results, which is very resistant to torsion with a great structural value and without additional material, since the housings of the drive motors must be present anyway. The drive motors can be hydrostatic motors, which in any case usually have quite rugged housings. The drive motors can also be electric motors of an advantageously battery-electrically driven lift loader. Due to the required magnetic flux through the housing of electric motors, these housings are of thick-walled steel, such that they already suffice to receive the forces that arise in the frame. In all the fork lifts with electric drive motors known to date the great expense for steel for the motor housing was only for the magnetic flux, while here for the first time the mechanical characteristics of this rugged housing are utilized in the development of a rugged and sturdy vehicle. The proposed designing of the drive components and the drive motors as a part of the frame results in a considerable space saving, such that a lift loader with favorable structural dimensions can be obtained and there is still sufficient space for a favorable assembly and maintenance. In electric motors the brushes of the drive motors are quite accessible. The production costs are low due to the simple vehicle construction. During production it is possible to have larger preassembly groups so that the assembly conditions are more favorable in mass production.

The arrangement of drive motors, especially hydrostatic drive motors, with parallel drive flange axes, but displaced with regard to each other, such that each drive motor projects on the other side over the longitudinal median plane of the vehicle, is already known. In such an arrangement the housings of the two motors can according to the invention be connected with each other on a sufficiently large flange surface, or the two motors, especially hydrostatic motors, can be contained in a sufficiently large common housing.

However, a particularly advantageous solution results if the two drive motors are arranged coaxially to each other and are flanged to each other with the end faces directly or indirectly, e.g., through an intermediate housing.

It is also particularly advantageous if each back-gearing arrangement is designed as a two-stage spur gear system, in which the back gearing of the two transmission steps are designed so that the distance between axes of the two stages is identical, so that the wheel hub and the motor can be arranged coaxially to each other, so that, for example, the boring in the housing for wheel hub and motor flange can be done in one operation and a continuous axis with wheel hubs and motors results.

In the case of lift loaders according to the invention, it is also advantageous to support the lifting structure directly on the transmission housings, as in vehicles according to the familiar type. It is expedient, especially in such a case, if the fastening point of the tilting cylinder on the vehicle side is located in the vicinity of the connecting site between a lateral vehicle frame longitudinal strut and the assigned transmission housing, preferably directly on the latter, so that a force of the countermoment formed by the counterweight can flow to the load directly through the tilting cylinder and thus the transmission housing is relieved of this moment.

The vehicle is expediently provided with disk brakes and the latter are located at the end face of a motor, such that the two brake disks lie alongside each other.

In a particularly advantageous arrangement, this facilitates providing a brake clamp that simultaneously acts on both brake disks. Because these two brake disks in this arrangement lie in the longitudinal median plane of the vehicle, brake actuation can be induced directly. For example, the brake pedal can be supported directly over the brake on the axis formed by the wheel hubs and drive motors and the brake cable of the parking brake can also be connected directly to the brake clamp. Guide components for the brake movement and braking force and transfer components, which are required when the brakes are located in the vicinity of the wheels, are thus not necessary in the arrangement according to the invention.

The battery can lie in a simple manner on the lower horizontal flange of the lateral strut and possibly a corresponding flange on the rear cross bar, e.g., on the counterweight, such that a very simple design results with respect to this also.

Another advantageous design results in the case of a lift loader with an operator-protection roof if the front struts of the latter are supported on the transmission housings. Because the operator-protection roof must have a quite rugged construction in order to withstand the loads that may be imposed upon it and thus the connecting points of the front operator-protection roof struts must be correspondingly sturdy, this arrangement provides a very favorable solution as compared with the hitherto familiar fastening of the operator-protection roof on a vehicle frame formed of canted plate, in which case it is then necessary to reinforce the points at which the operator-protection roof strut is supported in an appropriate manner.

Figure 2:
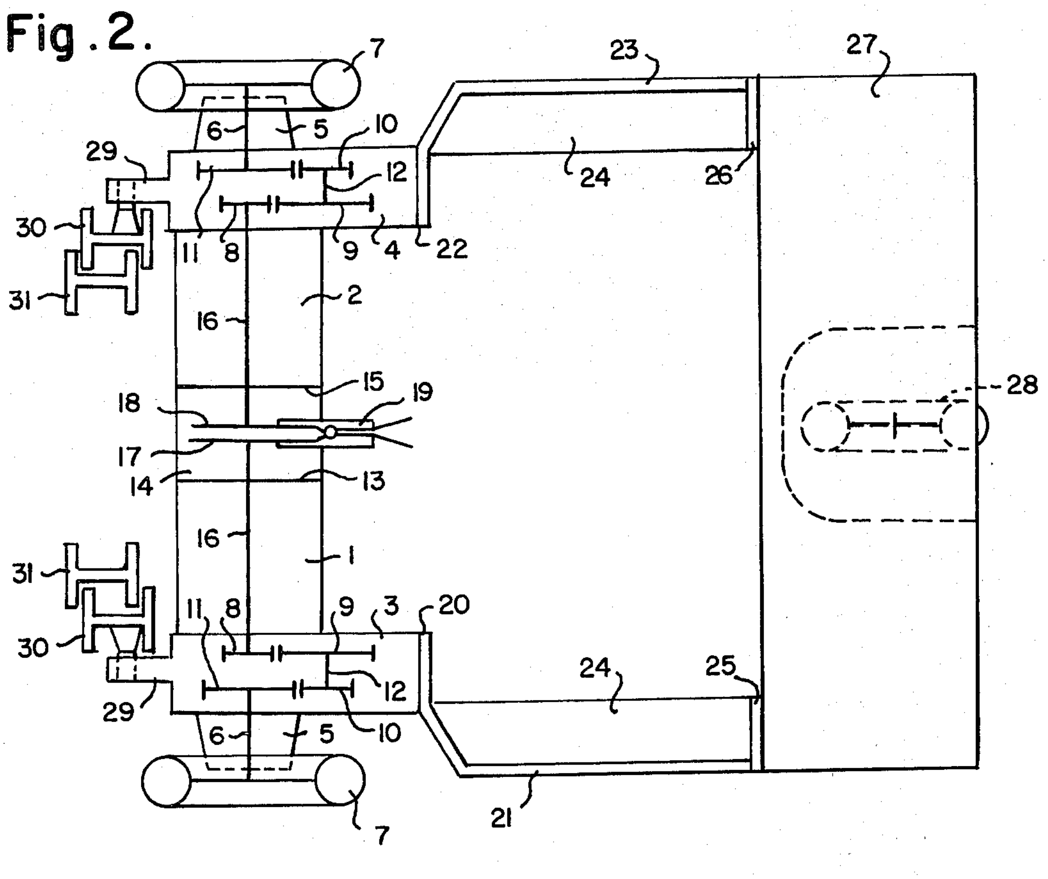

In the foregoing general description, we have set out certain objects, purposes and advantages of our invention. Other objects, purposes and advantages of this invention will be apparent from a consideration of the following description and the accompanying drawings in which:

FIG. 1 is a semi-schematic side view of a lift loader according to our invention; and FIG. 2 is a plan view, partly cut away of the loader of FIG. 1.

Referring to the drawings, we have illustrated a lift loader provided with two drive motors 1 and 2, of which drive motor 1 is flanged on transmission housing 3 and drive motor 2 is flanged on transmission housing 4. A wheel hub carrier 5, in which a shaft 6 is supported and on which a vehicle wheel 7 is fastened is located at each of the transmission housings 3 and 4. A two-stage gear unit is located in each of the transmission housings 3 and 4, in which case the first stage is comprised of the pinion 8 on the shaft 16 of the drive motor and the intermediate gear 9 and the second stage is comprised of the intermediate pinion 10 and gear 11, which is fastened on the shaft 6. The gears 9 and 10 are fastened on a common shaft 12.

The drive motor 1 is flanged with a flange 13 onto the intermediate housing 14 and the drive motor 2 is flanged with a flange 15 onto this intermediate housing 14. The shaft 16 of each of the two drive motors 1 and 2 passes through this intermediate housing 14, in which case a brake disk 17 is fastened on the shaft 16 of drive motor 1 and a brake disk 18 is fastened on the shaft 16 of drive motor 2. The two brake disks 17 and 18 are actuated by a common brake clamp 19.

The transmission housing 3 is flanged onto a flange surface 20 at the left-hand lateral strut 21, e.g., by means of bolts (not shown in the drawing). The transmission housing 4 is bolted in the same manner to a flange 22 at the right-hand strut 23. Each strut 21 and 23 has a lower strut flange surface 24, on which the battey can be placed. The strut 21 is connected with the counterweight 27 by means of a flange 25 and the strut 23 is connected with it by means of a flange 26; the counterweight forms the rear cross bar and the rear wheel (or gear) 28 is supported in it in a swiveling bolster or pivoted bogie (not shown in the drawing).

Each of the transmission housings 3 and 4 has a boom 29 that extends forward. The lifting structure consists of a vertical mast section 30 and a retractable mast section 31, in which case the vertical mast section 30 is pivotably supported on the assigned side in the boom 29. A fastening eye 32 is provided on the vertical mast section 30, in the which eye the piston rod 33 of the tilting cylinder 34 is articulated; the latter in turn is connected in a hinged manner in a boom 35, in which case this boom 35 is located in the vicinity of the flange 20 or 22 at the transmission housing 3 or 4. The rear strut 36 of the operator-protection roof is supported on the counterweight 27 and each of the two front struts 37 of the operator-protection roof is supported on one of the transmission housings 3 and 4.

It is essential that a front cross bar is formed by the rigid connection of the two drive motors 1 and 2 with each other, through which the frame 27, 21, 23, 3, 4, 1, 2, 14 becomes a closed frame. The manner in which a transmission housing 3 or 4 is connected with the assigned strut 21 or 23 is of subordinate importance.

In the foregoing specification we have set out certain preferred embodiments of our invention, however, it will be understood that this invention may be otherwise embodied within the scope of the following claims.

We claim:

1. A lift loader such as a fork lift comprising two side and one rear frame elements, a pair of drive wheels on said frame elements, a pair of drive motors, a transmission housing with a gearing arrangement drivingly connecting each said motor to a drive wheel whereby each of said motors drives one of said drive wheels, each of said transmission housings being joined to the frame and being flanged onto one end of its corresponding motor at one side and supporting a wheel hub on the other side, said frame being provided with a rear cross bar and at least two lateral struts, each of said transmission housings being connected to one of said struts to form an extension thereof, said drive motors having drive shaft axes parallel to each other and being connected together at their ends opposite the transmission housings in a rigid bending resistant manner to form a front frame element.

2. A lift loader according to claim 1 wherein each of said transmission housings is joined to and forms a part of each side frame as a supporting structural element thereof.

3. Lift loader according to claim 1 or 2, characterized in that the drive motors are arranged coaxially with regard to each other and are flanged to each other with their end faces.

4. Lift loader according to claim 3, characterized in that the drive motors are arranged coaxially to the wheel hub shafts.

5. Lift loader according to claim 1 or 2, characterized in that the drive motors are electric motors.

6. Lift loader according to claim 1 or 2, characterized in that the drive motors are hydrostatic motors.

7. Lift loader according to claim 1 or 2, characterized in that each transmission housing is flanged to the connected strut.

8. Lift loader according to claim 1 or 2, characterized in that the rear cross bar of the frame is constructed of a counter-weight.

9. Lift loader according to claim 3, with a disk brake unit for each vehicle wheel, characterized in that the brake disks are arranged alongside each other at the end faces of the drive motors.

10. Lift loader according to claim 9, characterized in that the two brake disks assigned to the drive motors on each vehicle side are acted upon by a common clamp.

11. Lift loader according to claim 1 or 2 in which the lifting mast is supported at the transmission housings and one end of a tilting cylinder is fastened on the vehicle side at each transmission housing of the pertinent vehicle side in the region of its connection with the corresponding struts.

12. Lift loader according to claim 1 or 2 with an operation-protection roof characterized in that each of two front struts of an operator-protection roof is supported on one of the transmission housings.

13. Lift loader according to claim 1 having a battery-electric drive characterized in that each of the two side frames is equipped with a lower strut flange surface provided for receiving a battery.

* * * * *